United States Patent
Kanazawa

(10) Patent No.: US 6,551,211 B2
(45) Date of Patent: Apr. 22, 2003

(54) TRANSMISSION FOR FOUR WHEEL DRIVE VEHICLE

(75) Inventor: Kazuo Kanazawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 35 days.

(21) Appl. No.: 09/950,662

(22) Filed: Sep. 13, 2001

(65) Prior Publication Data

US 2002/0032094 A1 Mar. 14, 2002

(30) Foreign Application Priority Data

Sep. 14, 2000 (JP) ........................................ 2000-280601

(51) Int. Cl.[7] .............................................. F16H 37/08
(52) U.S. Cl. ........................ 475/206; 475/199; 180/248
(58) Field of Search ................................. 475/206, 198, 475/199; 180/247, 248, 249; 74/329, 330, 331, 333, 335

(56) References Cited

U.S. PATENT DOCUMENTS

| 4,630,705 A | * | 12/1986 | Kobayashi | 180/247 |
| 4,727,954 A | * | 3/1988 | Matsumoto | 180/249 |
| 4,744,437 A | * | 5/1988 | Matsumoto | 180/249 |
| 4,907,472 A | * | 3/1990 | Mura | 475/206 X |
| 5,906,557 A | * | 5/1999 | Kobayashi | 475/199 |
| 6,199,653 B1 | * | 3/2001 | Matsufuji et al. | 180/247 X |

FOREIGN PATENT DOCUMENTS

| JP | 402286951 | * 11/1990 | 475/206 |
| JP | 5-112149 | 5/1993 | |
| JP | 7-167257 | 7/1995 | |
| JP | 2652715 | 5/1997 | |
| JP | 2673279 | 7/1997 | |
| JP | 2732309 | 12/1997 | |

* cited by examiner

Primary Examiner—Richard M. Lorence
Assistant Examiner—Ha Ho
(74) Attorney, Agent, or Firm—McGinn & Gibb, PLLC

(57) ABSTRACT

In a twin shaft type transmission having an input shaft and a counter shaft, a planetary gear type center differential coaxially provided with the counter shaft comprises a hollow center differential input shaft connected coaxially with the counter shaft, a first sun gear mounted on the center differential input shaft, a second sun gear provided coaxially with the first sun gear for outputting power to a rear drive shaft, a first pinion meshing with the first sun gear, a second pinion formed integrally with the first pinion and meshing with the second sun gear, a carrier rotatably holding the first and second pinions for outputting power to a front drive shaft, and a hub secured to the inside of the carrier and extending through a space between the first and second sun gears to the inside of the center differential input shaft and connected with the front drive shaft.

5 Claims, 3 Drawing Sheets

TRANSMISSION FOR FOUR WHEEL DRIVE VEHICLE

BACKGROUND OF THE INVENTION

1. Field of the Invention

The present invention relates to a transmission for a four wheel drive vehicle and more particularly to a power distribution apparatus of a twin shaft type transmission having an input shaft and a counter shaft.

2. Discussion of Prior Arts

Some of so-called twin shaft type transmissions (transmissions having an input shaft for inputting power from an engine and a counter shaft on which shift gears are mounted) for four wheel drive vehicles employ a bevel gear type center differential for distributing power between front and rear wheels, as disclosed in Japanese Patent Application Laid-open No. Toku-Kai-Hei 7-167257. According to the technology proposed in the disclosure, the center differential is disposed coaxially with the counter shaft and power after gearshifting is inputted from the counter shaft through a differential casing. A pair of pinions are rotatably mounted on the differential case so as to equally distribute power inputted to the differential casing between front and rear wheels through a pair of side gears meshing with the pinions, respectively. A front drive shaft is coaxially disposed in the counter shaft. The power transmission to the front drive shaft is directly performed through a front output shaft connected to one side gear. Further, a rear drive shaft is coaxially disposed with an input shaft from an engine and the power transmission to the rear drive shaft is performed through a rear output shaft connected to the other side gear and a pair of transfer gears.

Several technologies in which, in order to realize an unequal torque distribution between front and rear wheels and to enhance a cornering ability and a steering characteristic of a four wheel vehicle, a bevel gear type center differential is replaced with a planetary gear type center differential, have been proposed. For example, Japanese Patent Application Laid-open No Toku-Kai-Hei 5-112149 proposed by the applicant of the present invention discloses a technique in which, in an automatic transmission wherein an output shaft is disposed coaxially with an input shaft and a front drive shaft is arranged in parallel with these input and output shafts, a planetary gear type center differential is disposed coaxially with the output shaft and power transmitted from a first sun gear provided on the output shaft to a second sun gear through a second pinion is transmitted directly to a rear drive shaft and further power transmitted to a carrier through a pinion shaft supporting the first and second pinions is transmitted to a front drive shaft through a pair of reduction gears.

However, in case of the twin shaft type transmission as disclosed in Toku-Kai-Hei 7-167257, it is difficult to dispose a planetary gear type center differential on the same axis as the counter shaft in place of the bevel gear type center differential.

Since the front drive shaft is disposed inside of the counters haft, it is difficult to connect the reduction gear secured to the outer periphery of the carrier with the front drive shaft without incurring a large change of geometry and a complication of construction.

SUMMARY OF THE INVENTION

It is an object of the present invention to provide a twin shaft type transmission for a four wheel drive vehicle having an input shaft for inputting power of an engine and a counter shaft capable of disposing a planetary gear type center differential on the same axis as the counter shaft with a simple constitution.

To accomplish the object, a center differential accommodated in a twin shaft type transmission for a four wheel drive vehicle having an input shaft driveably connected with an engine, a hollow counter shaft arranged in parallel with the input shaft, shift gear trains provided between the input shaft and the counter shaft in a meshing relationship with each other, one of front and rear drive shafts coaxially provided in the counter shaft, the center differential comprises a hollow center differential input shaft connected coaxially with the counter shaft for inputting power to the center differential, a first sun gear mounted on the center differential input shaft, a second sun gear provided coaxially with the first sun gear for outputting power to the other of the front and rear drive shafts, a first pinion meshing with the first sun gear and provided around the center differential input shaft, a second pinion formed integrally with the first pinion and meshing with the second sun gear, a carrier rotatably holding the first and second pinions and enclosing the first and second sun gears and the first and second pinions therein for outputting power to one of the front and rear drive shafts, and a hub secured to the inside of the carrier and extending through a space between the first and second sun gears to the inside of the center differential input shaft and connected with one of the front and rear drive shaft.

DETAILED DESCRIPTION OF PREFERRED EMBODIMENTS

Figure 1:
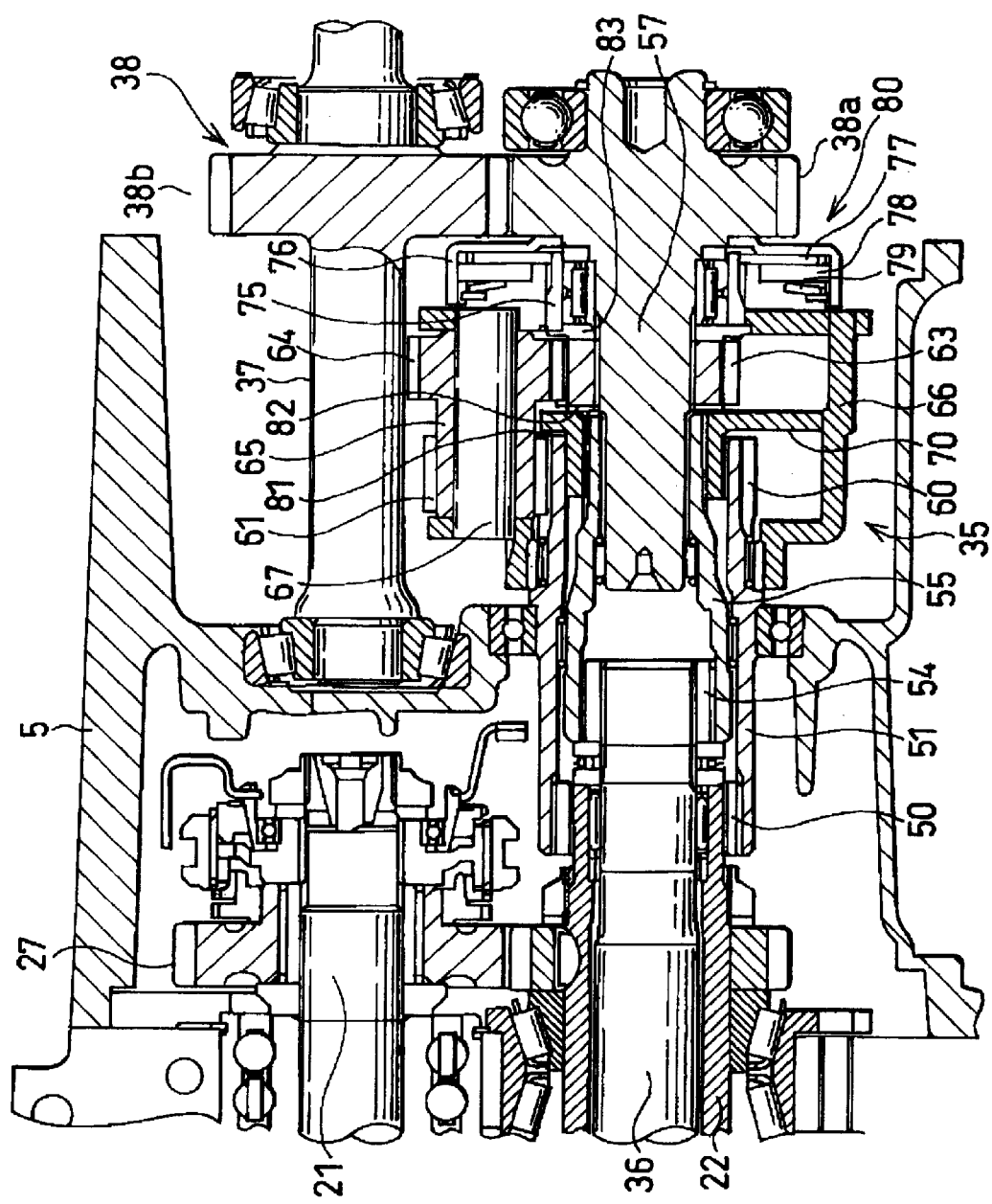
FIG. 1 is a sectional view showing a center differential portion according to the present invention.
Figure 2:
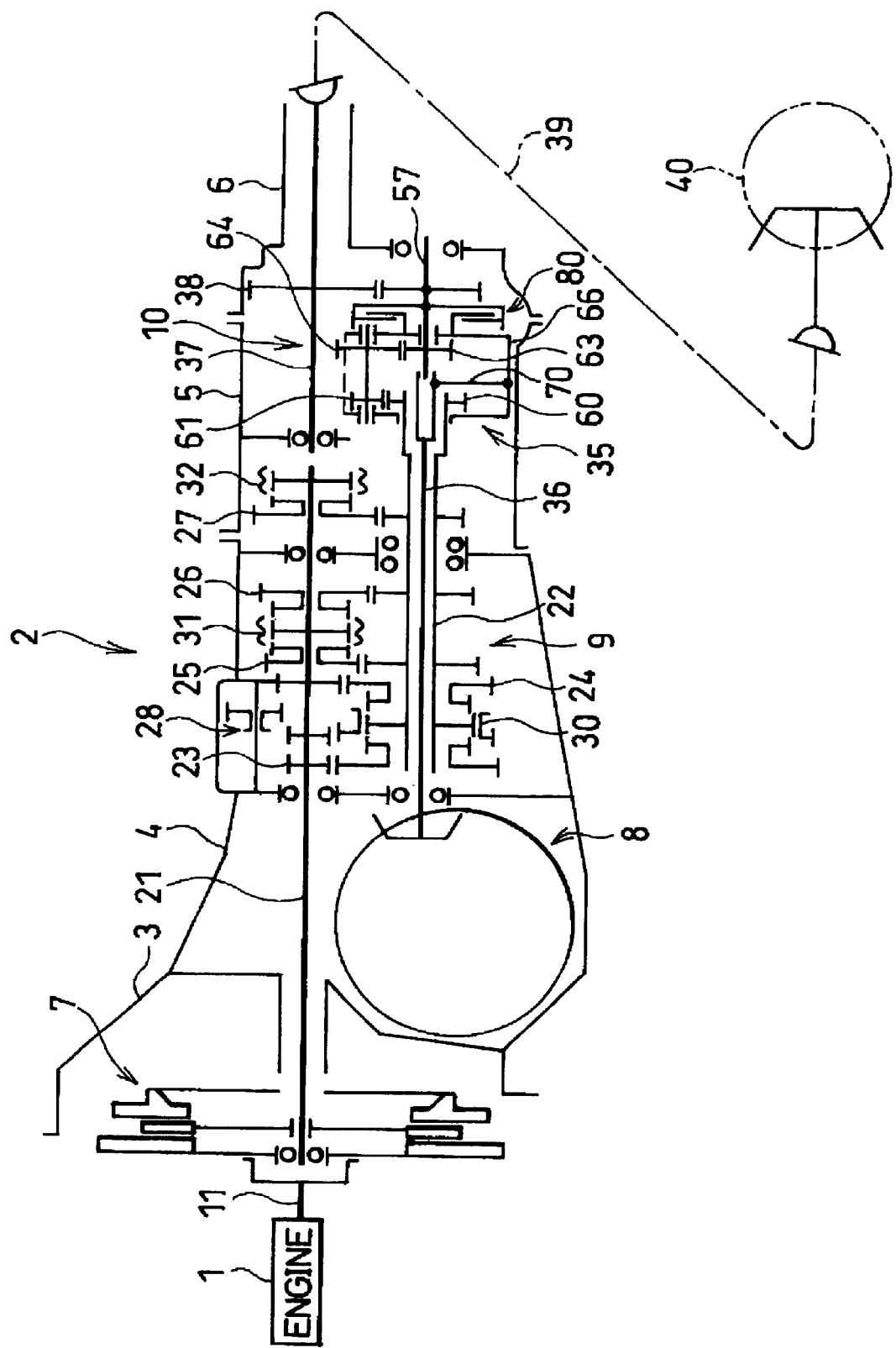
FIG. 2 is a skeleton diagram showing a transmission according to the present invention.

Referring now to FIGS. 1 and 2, reference numeral 1 denotes an engine disposed in a front portion of a vehicle and reference numeral 2 denotes a transmission gearbox connected to a rear part of the engine 1. Behind a clutch housing 3 of the transmission gearbox 2, a transmission case 4 is formed integrally. Further, a transfer case 5 is connected with a rear part of the transmission case 4. Further, an extension case 6 is connected with a rear part of the transfer case 5. The clutch housing 3 includes a starting clutch 7, the transmission case 4 includes a final reduction gear unit 8 and a manual transmission 9 and the transfer case 5 includes a transfer section 10.

A crankshaft 11 of the engine 1 is connected with the starting clutch 7 and the starting clutch 7 is connected with an input shaft 21 of the manual transmission 9.

The manual transmission 9 has a hollow counter shaft 22 provided in parallel with the input shaft 21 and a $1^{st}$ gear train 23, a $2^{nd}$ gear train 24; a $3^{rd}$ gear train 25 and a $4^{th}$ gear train 26 are arranged in this order between the input shaft 21 and the counter shaft 22. A synchromesh mechanisms 30 is provided between the $1^{st}$ gear train 23 and the $2^{nd}$ gear train 24 and a synchromesh mechanism 31 is provided between the $3^{rd}$ gear train 25 and the $4^{th}$ gear train 26, respectively. Further, a reverse gear train 28 is disposed between the $1^{st}$ gear train 23 and the $2^{nd}$ gear train 24.

Further, the input shaft 21 and counter shaft 22 extends inside of the transfer case 5 in which a 5$^{th}$ gear train 27 and synchromesh mechanism 32 are disposed between these two shafts. Thus, the manual transmission 9 is constituted so as to be shifted to any one of five forward speed gears by selectively actuating those three synchromesh mechanisms 30, 31 and 32 and to be shifted to a reverse position by engaging the reverse gear train 28.

In the transfer case 5, a planetary gear type center differential 35 is disposed on the counter shaft 22. The center differential 35 is driveably connected with a front drive shaft 36 disposed in the counter shaft 22 and also driveably connected with a rear drive shaft 37 disposed on the sane axis as the input shaft 21 through a transfer gear train 38 so as to distribute a shifted power inputted from the counter shaft 22 between both drive shafts 36, 37. Further, the power transmitted to the front drive shaft 36 is transmitted to the final reduction gear unit 8 of front wheels and on the other hand the power transmitted to the rear drive shaft 37 is transmitted to a final reduction gear unit 40 of rear wheels through a propeller shaft 39.

Next, the constitution of the center differential 35 according to the present invention will be described in detail by reference to FIG. 1.

The center differential 35 includes a hollow center differential input shaft 51 spline-fitted at an end portion thereof to the outer periphery of the counter shaft 22 through an intermediate member 50, a hollow front output shaft 55 spline-fitted at an end portion thereof over the outer periphery of the hollow front output shaft 55 through a intermediate member 54 and a rear output shaft 57 fitted at an end portion thereof to the front output shaft 55. These shafts 51, 55 and 57 are in a rotatable relationship with each other.

A first sun gear 60 having a large diameter is formed integrally with the center differential 51 at the other end thereof and a plurality of first pinions 61 meshes with the first sun gear 60. In this embodiment, three first pinions 61 are arranged around the first sun gear 60 at an equal interval.

Also, a second sun gear 63 having a small diameter is spline-fitted to the rear output shaft 57 and a plurality of second pinions 64 having a large diameter mesh with the second sun gear 63 therearound. In this embodiment, three second pinions 64 are arranged around the second sun gear 63 at an equal interval.

A first pinion 61 and a second pinion 64 are formed integrally on a pinion member 65, forming a pair of the first and second pinions 61, 64. In this embodiment, three pairs of first and second pinions 61, 64 are formed on the pinion member 65. The pinion member 65 is rotatably supported by a pinion shaft 67 secured to a carrier 66.

That is, the center differential input shaft 51 is rotatably fitted to the carrier 66 from the front and the rear output shaft 57 is rotatably fitted to the carrier 66 from the rear. The first sun gear 60 and the second sun gear 63 are accommodated in a space enclosed by the carrier 66. Further, the pinion shaft 67 is provided across the front and rear part of the carrier 66 in such a manner that the first pinion 61 meshes with the first sun gear 60 and the second pinion 64 meshes with the second sun gear 63.

The rear end of the front output shaft 55 is projected into the carrier 66. A hub 70 secured to the inner periphery of the carrier 66 extends inwardly through a space between the first and second sun gears 60, 63 and is spline-fitted over the front output shaft 55 at the rear end thereof. Further, power transmitted from the pinion member 65 to the carrier 66 through the pinion shaft 67 is transmitted to the front drive shaft 36 through the hub 70 and the front output shaft 55.

On the other hand, a transfer drive gear 38a is integrally formed with the rear output shaft 57 at the rear thereof. Further, a transfer drive gear 38b meshing with the transfer drive gear 38a is integrally formed with the rear drive shaft 37, constituting a transfer gear train 38. Power transmitted to the rear output shaft 57 through the second sun gear 63 is transmitted to the rear drive shaft 37 through the transfer gear train 38, after being shifted by the transmission.

Further, a cylindrical clutch hub 75 is secured to the rear surface of the carrier 66 around the rear output shaft 57. Further, a clutch drum 76 is secured to the rear output shaft 57 opposite to the clutch hub 75. Further, a drive plate 77, a driven plate 78 and a coned disc spring 79 are provided in a space between the clutch hub 75 and the clutch drum 76. Thus, an initial torque generating section 80 is constituted by these components. The initial torque generating section 80 is for generating an initial torque operating between the carrier 66 and the rear output shaft 57, namely between front and rear wheels and is established such that the generating initial torque is a minimum of necessity by properly establishing the pressure of the coned disc spring 79.

Distribution of reference torque of the center differential 35 between front and rear wheels is established to a desired ratio, for example, TF:TR=36.4:63.6 by properly establishing an intermeshing pitch radius of the first sun gear 60 and the first pinion 61 and an intermeshing pitch radius of the second sun gear 63 and the second pinion 64.

A first friction washer 81 as a first friction member is provided between the first sun gear 60 and the hub 70, a second friction washer 82 as a second friction member is provided between the second sun gear 63 and the hub 70 and a third friction washer 83 as a third friction member is provided between the second sun gear 63 and the carrier 66, respectively. That is, these friction washers 81, 82 and 83 constitute a differential limiting mechanism of the center differential 35.

Since the first sun gear 60 and the first pinion 61 are constituted by helical gears, when forwarding the first pinion 61 generates such a thrust load as biasing the first sun gear 60 rearwardly (on the hub 70 side). Further, since the second sun gear 63 and the second pinion 64 are constituted by helical gears, when forwarding the second pinion 64 generates such a thrust load as biasing the second sun gear 63 forwardly (on the hub 70 side). As a result, the first friction washer 81 and the second friction washer 82 are pressed against the hub 70 by the first and second sun gears 60, 63 respectively to generate differential limiting torque. When rearwarding, the thrust load of the second sun gear 63 generates in a reverse direction and as a result the third friction washer 82 is pressed on the carrier 66 by the second sun gear 63 to generate differential limiting torque.

Next, an operation of thus constituted manual transmission 2 will be described.

First, when the starting clutch 7 is released during stops or running and the gear is shifted to a forward position, either of the first to fifth gears 23 to 27 is selected while synchronizing with the input shaft 21. After that, when the clutch 7 is engaged, power of the engine 1 is inputted to the input shaft 21 of the manual transmission 9 and the power shifted by the selected gear train is outputted to the counter shaft 22. Further, when the gear is shifted to a reverse position while the starting clutch 7 is released during stops, the reverse gear train 28 is engaged and the power inversed by the reverse gear train is outputted to the counter shaft 22. Thus, the engine power is shifted to five forward speed positions and one reverse position.

The power shifted by the manual transmission 9 is inputted to the first sun gear 60 of the center differential 35 and is transmitted to the pinion member 65 through the first pinion 61.

Since the center differential 35 has a torque distribution ratio between front and rear wheels established to TF:TR= 36.4:63.6 by properly selecting gear dimensions, the shifted power is distributed and outputted to the carrier 66 by 36.4% and to the second sun gear 63 by 63.6%, respectively. The power transmitted to the carrier 66 is transmitted to the front wheels through the hub 70, the front output shaft 55, the front driveshaft 36 and the final reduction gear unit 8. According to the rear-over distributed torque distribution ratio of this embodiment, the vehicle has a taste of oversteer and as a result good turning ability and good steering characteristic.

When the differential rotation generates between front and rear wheels, the first and second friction washer 81, 82 provides the center differential 35 with a differential limiting effect automatically when forwarding and the third friction washer 83 provides the center differential 35 with a differential limiting effect automatically when rearwarding. As a result, maneuverability and steering stability of the vehicle is enhanced.

Figure 3:
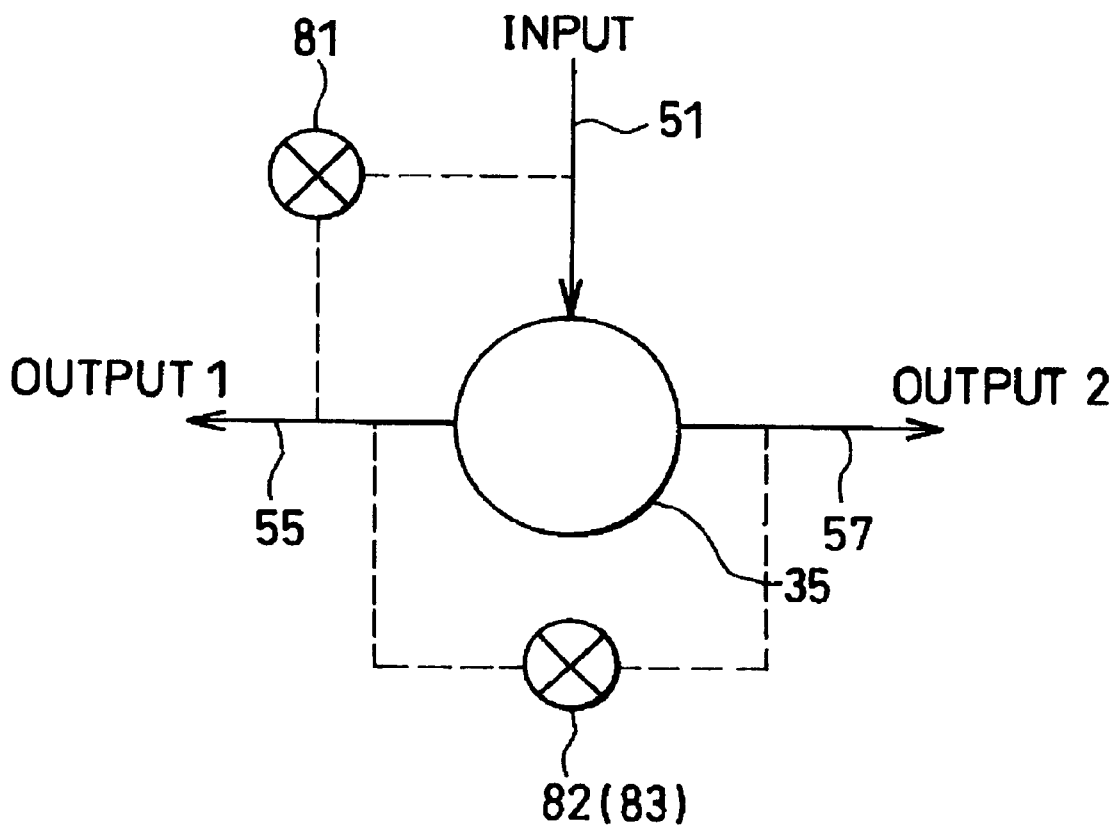
FIG. 3 is an explanatory view of differential limiting torque.

As illustrated in FIG. 3, since the first friction washer 81 substantially produces a differential limiting between the center differential input shaft 51 and the front output shaft 55, a differential limiting torque obtained by an equivalent friction washer of the first friction washer 81 is ½ times that of the second friction washer 82 or the third friction washer 83 substantially producing a differential limiting between the front output shaft 55 and the rear output shaft 57.

According to the embodiment like this, the center differential input shaft 51 formed into a hollow is connected with the counter shaft 22, the front output shaft 55 from the center differential 51 disposed inside of the center differential 51 is connected with the front drive shaft 36, and the hub 70 secured to the carrier 66 extending to the inside of the center differential input shaft 51 through the slit between the first and second sun gears 60 and 63, is connected with the front output shaft 55. Thus, according to the construction of the center differential 33 of this embodiment, the carrier 66 can be driveably connected with the front drive shaft 36 disposed in the counter shaft 22 with a simple structure.

Accordingly, in the twin shaft type transmission for a four wheel drive vehicle, a planetary gear type center differential can be disposed coaxially with the counter shaft with a simple construction and can easily realize an unequal torque distribution between front and rear wheels.

In particular, since the front output shaft 55 and the rear output shaft 57 can be disposed coaxially inside of the center differential input shaft 51, interchangeability with a bevel gear type center differential in which the front and rear output shafts are disposed coaxially inside of a differential case can be enhanced.

In other words, in case of a twin shaft type transmission for a four wheel drive vehicle in which a front drive shaft is disposed in a counter shaft and having a bevel gear type center differential, the bevel gear type center differential can be easily replaced with a planetary gear type center differential without incurring a large geometric change and complication of construction.

Further, since the first, second and third friction washers 81, 82 and 83 are disposed between the first sun gear 60 and the hub 70, between the hub 70 and the second sun gear 63 and between the second sun gear 63 and the carrier 66, respectively, a differential limiting mechanism can be incorporated in the center differential 35 with a simple construction and as a result down-sizing and weight reduction of a transmission can be realized.

In this case, particularly, a differential limiting mechanism can be easily accommodated in the carrier 66 by making use of the hub 70 secured to the carrier 66.

Further, since the first and second sun gears 60, 63 and the first and second pinions 61, 64 are constituted by helical gears, when forwarding the first and second pinions 61, 64 exert the first and second sun gears 60, 63 towards the hub 70 side and the first and second friction washers 81 and 82 simultaneously generate differential limiting effect. Further, when rearwarding, since the second pinion 64 exerts the second sun gear 63 towards the carrier 66 side, the third friction washer 83 generates differential limiting effect. That is, the differential limiting torque can be easily established by simultaneously operating both the first and second friction washers 81 and 82 which perform differential limiting on different shafts. Further, on establishing differential limiting torque, this provides vehicle designers with an expanded range of tunings within which vehicle performance can be tailored for specific requirements.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A center differential of a twin shaft transmission for a four wheel drive vehicle, said transmission having an input shaft driveably connected with an engine, a hollow counter shaft arranged in parallel with said input shaft, shift gear trains provided between said input shaft and said counter shaft in a meshing relationship with each other, one of front and rear drive shafts coaxially provided in said counter shaft, said center differential comprising:

a hollow center differential input shaft connected coaxially with said counter shaft for inputting power to said center differential;

a first sun gear mounted on said center differential input shaft;

a second sun gear provided coaxially with said first sun gear for outputting power to the other of said front and rear drive shafts;

a first pinion meshing with said first sun gear and provided around said center differential input shaft;

a second pinion formed integrally with said first pinion and meshing with said second sun gear;

a carrier rotatably holding said first and second pinions and enclosing said first and second sun gears and said first and second pinions therein for outputting power to one of said front and rear drive shafts; and a hub secured to the inside of said carrier and extending through a space between said first and second sun gears to the inside of said center differential input shaft and connected with one of said front and rear drive shafts.

2. The center differential according to claim 1, wherein said first sun gear and said first pinion comprise helical gears so as to exert said first sun gear in the direction of said hub when forwarding and said second sun gear and said second pinion comprise by helical gears so as to exert said second sun gear in the direction of said hub when forwarding.

3. The center differential according to claim 1, further comprising:
- a first friction member provided in a space between said first sun gear and said hub; and
- a second friction member provided in a space between said second sun gear and said hub.

4. The center differential according to claim 1, further comprising:
- a third friction member provided in a space between said second sun gear and said carrier.

5. A transmission system for a four wheel drive vehicle, comprising:
- an input shaft operatively connected with an engine;
- a hollow counter shaft arranged in parallel with said input shaft;
- shift gear trains provided between said input shaft and said counter shaft;
- a front drive shaft operatively connected with front wheels;
- a rear drive shaft operatively connected with rear wheels;
- a center differential having a first sun gear mounted on an end of an extended portion of said hollow counter shaft, a second sun gear provided coaxially apart from said first sun gear to be connected with one of said front drive shaft and said rear drive shaft, a first pinion meshing with said first sun gear, a second pinion coaxially integrated with said first pinion and meshing with said second sun gear and a carrier rotatably supported on said extended portion of said hollow shaft to rotatably hold said first pinion and said second pinion; and
- a hub secured to an inside of said carrier and extending into a space between said first sun gear and said second sun gear to be connected with an end portion of the other one of said front drive shaft and said rear drive shaft rotatably mounted inside said hollow counter shaft.

* * * * *